United States Patent
Hartig et al.

(10) Patent No.: US 6,485,339 B1
(45) Date of Patent: Nov. 26, 2002

(54) ELECTRIC MOTOR POD DRIVE SYSTEM FOR A VESSEL WITH A COOLING DEVICE

(75) Inventors: Rainer Hartig, Hamburg (DE); Wolfgang Rzadki, Glinde (DE); Reinhold Reuter, Schwall (DE); Stephan Brabeck, Boppard-Holzfeld (DE); Manfred Heer, Duengenheim (DE); Peter Hein, Berlin (DE); Christian Meyer, Berlin (DE); Ingo Schuering, Berlin (DE)

(73) Assignees: Siemens Aktiengesellschaft, München (DE); Schottel GmbH & Co. KG, Spay (DE)

( * ) Notice: Subject to any disclaimer, the term of this patent is extended or adjusted under 35 U.S.C. 154(b) by 0 days.

(21) Appl. No.: 09/463,269

(22) PCT Filed: Jul. 21, 1998

(86) PCT No.: PCT/DE98/02049

§ 371 (c)(1),
(2), (4) Date: Apr. 10, 2001

(87) PCT Pub. No.: WO99/05023

PCT Pub. Date: Feb. 4, 1999

(30) Foreign Application Priority Data

Jul. 21, 1997 (DE) .......................................... 197 31 816
Jan. 16, 1998 (DE) .......................................... 198 01 448

(51) Int. Cl.$^7$ ............................. B60L 11/00; H02K 5/10
(52) U.S. Cl. ............................................. 440/6; 310/87
(58) Field of Search ................................. 310/87; 440/6

(56) References Cited

U.S. PATENT DOCUMENTS

| | | | | |
|---|---|---|---|---|
| 2,714,866 A | * | 8/1955 | Pleuger et al. ................. 440/6 |
| 3,593,050 A | * | 7/1971 | Ware ............................. 310/87 |
| 3,650,310 A | * | 3/1972 | Childress ...................... 165/44 |
| 3,791,331 A | * | 2/1974 | Dilley ............................ 440/6 |
| 3,814,961 A | * | 6/1974 | Nelson et al. ................. 310/87 |
| 3,841,396 A | * | 10/1974 | Knaebel et al. ............... 165/44 |
| 4,445,046 A | | 4/1984 | Allegre et al. |
| 5,078,628 A | * | 1/1992 | Garis, Jr. ....................... 440/6 |
| 5,101,128 A | | 3/1992 | Veronesi et al. |
| 5,205,653 A | * | 4/1993 | Veronesi et al. ............ 384/306 |
| 5,403,216 A | | 4/1995 | Salmi et al. |
| 5,445,545 A | * | 8/1995 | Draper .......................... 440/6 |
| 5,698,917 A | * | 12/1997 | Shultz .......................... 310/87 |

FOREIGN PATENT DOCUMENTS

| | | |
|---|---|---|
| DE | 683 970 | 11/1939 |
| DE | 1 638 276 | 7/1971 |
| EP | 0 581 966 A1 | 2/1994 |
| WO | WO 97/09771 | 3/1997 |

OTHER PUBLICATIONS

Andersen et al, *New Type of Permanent Field Machines for Diesel Electric Propulsion Systems*, AES 97–Civil or Military All Electric Ship–Int'l Symposium and Exhibition, XP002087162, pp. 4–14 (1997).

Gloel et al, *Ein neues hocheffizientes Antriebssystem*, Engineering, Schiff & Hafen, pp. 40–44 (1997)

Siemens Brochure, Siemens–Schottel–Propulsor (SSP) The Podded Electric Drive with Permanently Excited Motor (1997).

* cited by examiner

*Primary Examiner*—S. Joseph Morano
*Assistant Examiner*—Andy Wright
(74) *Attorney, Agent, or Firm*—Schiff Hardin & Waite

(57) ABSTRACT

An electric propulsion pod for a ship having a electric propulsion pod heat rejection member. The electric propulsion pod is attached below the ship by a hollow ship access shaft. The electric propulsion pod contains an electric motor for producing a water propulsion. The electric motor generates an amount of heat that is conducted and subsequently released into the water through the electric propulsion pod and ship access shaft surfaces. The heat rejection member is fitted for increasing the conduction and subsequent release of the electric motor heat.

21 Claims, 4 Drawing Sheets

ELECTRIC MOTOR POD DRIVE SYSTEM FOR A VESSEL WITH A COOLING DEVICE

BACKGROUND OF THE INVENTION

1. Field of the Invention

The invention relates to an electric propulsion pod for a ship, which pod has an electric motor fitted into a design of propulsion pod which ensures favorable flow of the water around the pod, the propulsion pod being located on the bottom of the ship by means of a hollow -access shaft and the heat generated by the electric motor being rejected via the surface of the propulsion pod to the water flowing around it.

2. Description of the Prior Art

An electric propulsion pod for a ship corresponding to the above can be seen in the applicant's publication with the title: Siemens-Schottel-Propulsor (SSP) "The Podded Electric Drive with Permanently Excited Motor", presented to the AES 97—All Electric Ship 13-14.03.97, Paris. The publication on the Siemens-Schottel-Propulsor (SSP) shows an electric propulsion pod for a ship with a motor surface-cooled which is in a simple manner and is in the form of a permanently excited synchronous motor.

This motor, whose more precise details can be seen from FIG. 2 of the publication, is completely encapsulated and maintenance-free.

SUMMARY OF THE INVENTION

The object of the invention is to provide a solution which permits reliable cooling of the motor even when the electric propulsion pod is employed at overload in tropical waters with high water temperatures. In addition, the working temperature of the electric motor is to be lowered and a more uniform temperature of the individual components of the motor, for example the coil winding heads, is to be achieved.

The object is, in principle, achieved in that the heat is rejected, by heat rejection areas in the water both from the propulsion pod (17, 23) and from the access shaft (16, 18), that are employed to improve the heat conduction and rejection. The inclusion of the access shaft in the heat rejection from the motor very advantageously achieves the effect that the cooling of the motor is not limited to the surface of the propulsion pod only. This can advantageously occur, in accordance with the invention, without departure from the simple surface cooling as the cooling principle.

An embodiment of the invention provides for improving the heat rejection to be an increase in the effective heat rejection area. In the electric propulsion pod known from the prior art, only the outer wall of the propulsion pod, in the winding region of the electric motor, is provided as the effective heat rejection area. In this case direct heat rejection from the shrunk-in inner part takes place at the outer wall. This effective heat rejection area is substantially increased according to the present invention. The result is an advantageously improved thermal behavior of the propulsion pod.

A further embodiment of the invention provides for improving the heat rejection to be an increase in the temperature of the effective heat rejection area. Increasing the temperature of the effective heat rejection area advantageously increases the temperature difference relative to the surrounding sea water and satisfactory cooling of the propulsion system is ensured even in the case where the propulsion system is employed in tropical waters with water temperatures of between 30° C. and 35° C. This is important, particularly for cruise ships which pass through the Red Sea, for example.

In order to improve the heat conduction, in particular to improve the heat conduction from the winding region of the electric motor, provision is made for a material with higher thermal conductivity than steel to be used. For this purpose, a material made of non-ferrous alloy with good thermal conductivity is particularly advantageous. Copper-containing non-errous alloys, in particular, have a higher thermal conductivity than steel. When special copper bronzes are used, there is a further essential advantage that no growth occurs on the surface. It is therefore possible to dispense with the use of an anti-fouling paint on the surface of the pod and that of the transition between the pod and the access shaft. Dispensing with a coat of paint, in this way, leads to a not insubstantial increase in the surface temperature of the heat rejection area because anti-fouling paint coats have a thermal conductivity which is lower than that of metal by a power of 10. They act as an insulating layer and impair the heat rejection. An unexpected advantage is achieved by the use of a special copper bronze, the so-called propeller bronze G-CU Al 10 Ni being recommended in this case; not only is the thermal conductivity improved because such materials are better heat conductors than steel but a substantially increased heat rejection temperature is also achieved.

Provision is also made in the electric propulsion pod for the propulsion pod to have a reduced wall thickness, in the part directed into the access shaft, as compared with the wall thickness present in the part with the favorable flow configuration. This advantageously provides particularly good heat rejection into the access shaft from the part of the pod surface not directly cooled by the sea water. The wall thickness in the part of the propulsion pod directed into the shaft can be reduced as much as is permitted by the casting technique. There is, therefore, an essentially higher surface temperature in this region as compared with the rest of the central region of the motor pod, which has to have a favorable flow configuration and therefore has a relatively large wall thickness in the center.

Provision is also made for the propulsion pod to have an enlarged surface on the part directed into the access shaft, an enlarged surface due to ribs, beads or honeycomb sheet, for example. This advantageously achieves the effect that the heat rejecting surface is essentially enlarged so that, in this region, increased heat rejection can occur. The heat rejected is convectively distributed by the air located in the hollow access shaft and, in this way, passes via the large surface of the access shaft into the sea water.

An embodiment of the invention provides for components of the enlarged surface to have heat conduction devices (heat ducts) which are in connection with the inside of the electric motor. In this way, the surface temperature of the enlarged surface can be raised and, therefore, the heat rejection to the air circulating within the access shaft can be still further increased. This does not depart from the simple cooling which is a principle of the invention.

Additionally, or as an alternative, the access shaft can have a lower part which has, at least in part, a double-walled configuration, the inside of the double-walled part having heat conducting media such as air or water. Devices, for example fans, are also, if appropriate, provided in the access shaft for circulating the access shaft air, these devices being used to maintain a stable circulation. By this way, the heat rejected by the pod into the access shaft can be satisfactorily rejected to the access shaft wall and be led along the latter and through it to the sea water in a satisfactory manner.

The above devices are advantageously located in the lower part only of the access shaft, around which sea water always washes. The transition between the access shaft and the ship is located above the water line and thus sea water only washes around parts of the upper part of the access shaft. Reliable heat removal is achieved by the arrangement of the devices for increasing the heat removal in the lower part of the access shaft. If the propulsion pod is arranged on a short access shaft whose transition to the ship occurs below the water line, for which provision is likewise made, the corresponding devices are of course located in the whole of the access shaft. Because, in principle, no provision is made for the arrangement of the transition between the access shaft and the ship at the water line, only these two alternatives need to be considered for the arrangement of the heat rejection components in the access shaft.

As a supplement, or likewise as an alternative, provision is made for the propulsion pod to have devices which contain heat transfer media (heat ducts); such that, the heat can be advantageously led away directly, so that a particularly effective, low-cost and simple solution results. Pursuing this principle, furthermore, provision is made for the electric motor to have a hollow shaft, which is open at both ends, through which sea water can flow and which has, if required, a conical configuration. In consequence, cooling of the electric motor also takes place from the inside.

In another embodiment, provision is made for a convective cooling circuit to be arranged in the shaft of the electric motor, which circuit transports heat from the center of the electric motor to the cool ends. Thus, the area of the hub and, in fact, a part of the propeller surface can be advantageously used for conducting away the heat.

Provision is also made for the coil winding heads of the electric motor to have convectively operating heat ducts, which lead to the cool outer ends, to side fins or into the lower part of the access shaft. The coil winding heads are not in direct contact with the outer wall of the propulsion pod but they develop a substantial quantity of heat because of the currents flowing within them. In some cases, therefore, additional cooling of the coil winding heads is necessary and this can take place in a particularly simple manner by the heat ducts described above. The surface of the cool outer ends, the side fins or the lower part of the access shaft is utilized particularly favorably for this purpose.

In order to conduct away the heat developed by the coil winding heads directly the latter are also advantageously provided with heat bridges to the outer wall of the propulsion pod. In the case of smaller propulsion systems, it is then even possible to dispense with heat ducts and further cooling components. The cooling of the propulsion pod at the outer wall is then sufficient.

These heat conducting bridges advantageously consist of heat conducting plastic with a filler material of a material which conducts heat particularly well. Epoxy resin can, for example, be considered as the plastic, while minerals can be used as the filler material. In this arrangement, the heat conducting bridges can be larger than the coil winding head dimensions and can, for example, be configured as heat conducting rings, which advantageously have parting lines between the individual coil winding head sections. The result is a particularly large-volume configuration of the heat conducting bridges with good thermal conduction from the coil winding heads to the outer wall of the propulsion pod.

Provision is also made for the propulsion pod and/or the lower part of the access shaft to have surface enlarging elements, for example external ribs or external beads, to improve the cooling. This likewise achieves improved heat removal from the motor into the sea water, it being possible, in a particularly advantageous manner, for these external ribs or external beads also to undertake flow guidance functions which support the action of fins.

Cooling ducts, through which water flows and which have a conical configuration to avoid blocking due to flotsam, are likewise provided at the transition between the access shaft and the propulsion pod; this provides particularly good cooling for this region. Heat ducts, which are led out from the inside of the propulsion motor, can advantageously end at the cooling ducts.

Provision is also made, if appropriate, for the external region of the motor and/or the motor/access shaft transition region to have an at least partially double-walled configuration, the space between the two walls being configured so that a coolant, in particular water, can flow through it. In such double-walled spaces, a circulation occurs due to the one-sided supply of heat so that these double-walled regions can be used as good heat rejection regions. In addition, they have the advantage that they can, for example, reinforce the lower part of the access shaft or that they can contribute to the formation of a shape which is particularly favorable to flow. This therefore makes it possible to achieve a combined effect.

The heat conducting devices, like the electric motor, are of maintenance-free design. This is readily possible because they operate without circulating pumps. They can therefore be configured as a unit forming a block with the propulsion pod motor, for which no provision is made for maintenance, or even for repair, in service operation. Because the heat conducting and rejection devices are completely located in the lower part of the access shaft, they do not interfere with the dismantling of the lower part of the access shaft. This dismantling work takes place by divers when the propulsion pod is exchanged for repair, the ship remaining in the water. As compared with the known heat-exchanger solutions with heat exchangers in the ship or on deck, there are therefore substantial handling and cost advantages.

DESCRIPTION OF THE PREFERRED EMBODIMENT

Figure 1:
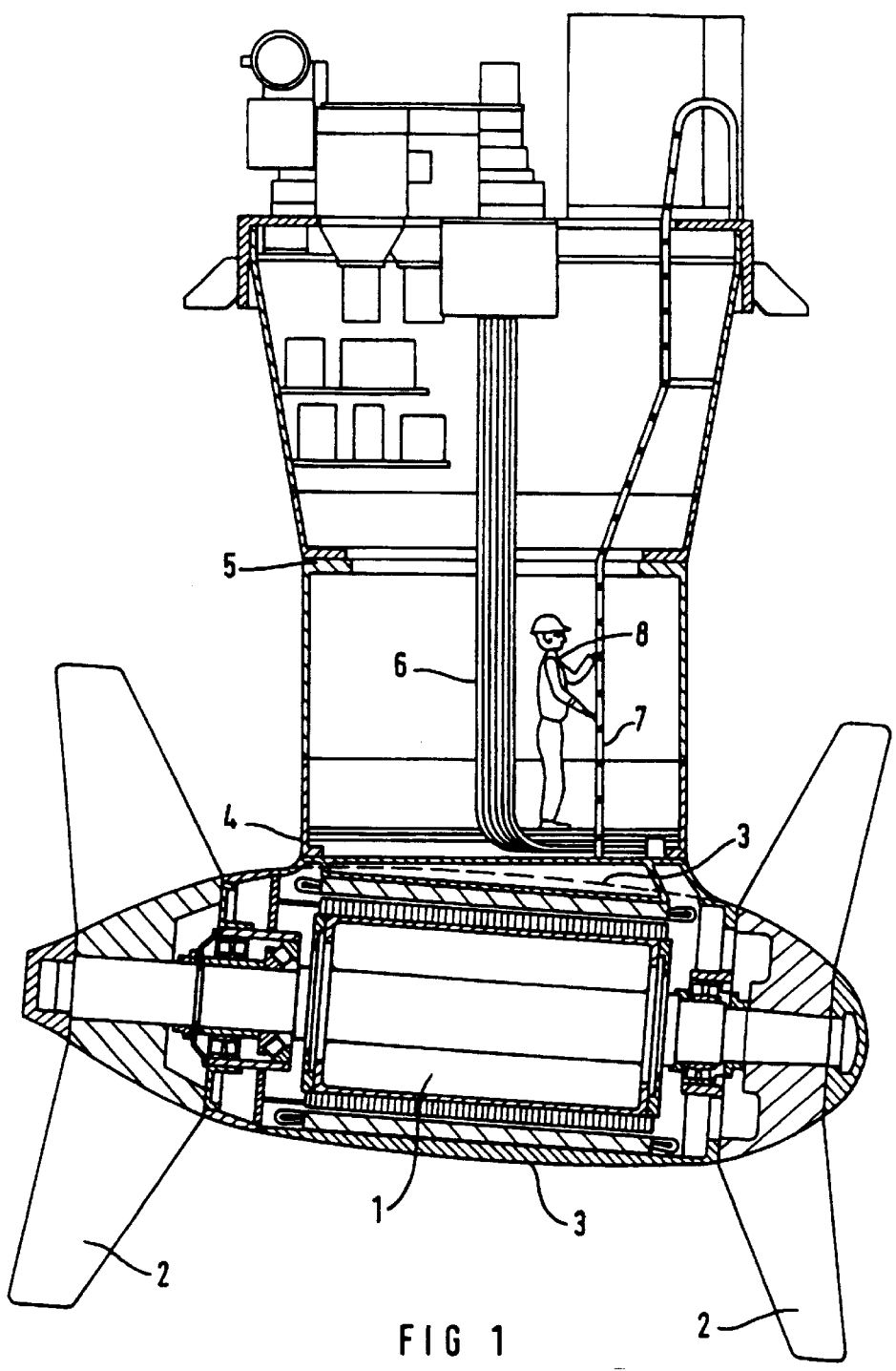
FIG. 1 shows a sectional view of a propulsion pod corresponding to the prior art (publication AES 97).

In FIG. 1, which shows the prior art on which the invention is based, 1 designates the electric propulsion motor, 2 designates the propeller driven by the propulsion motor 1, 3 designates the pod outer wall, whose contour is also retained in the part directed into the access shaft, 4 designates the flange transition between the propulsion pod and the lower part of the access shaft and 5 designates a flange in the middle of the access shaft. The cable harness 6 passes down through the access shaft to supply current to the electric motor 1. A ladder 7, by means of which an inspector 8 has easy access to the lower part of the access shaft, is located in the access shaft itself. Because the propulsion pod is maintenance-free and is not configured to be accessible, the inspector 8 only has to monitor the flange connections 4 and 5. Because these are designed for a long life, the lower part of the ladder 7 is dispensed with in more recent embodiments, and therefore also in the case of the embodiment according to the invention. The lower part of the access shaft is therefore free for installation features, even for installation features which make access to the outer wall of the electric motor impossible.

Auxiliary equipment (not drawn in any more detail), for example bilge pumps, the compressed air supply for the seal at the transition of the access shaft to the ship etc., are fitted in the upper part of the access shaft.

Figure 2:
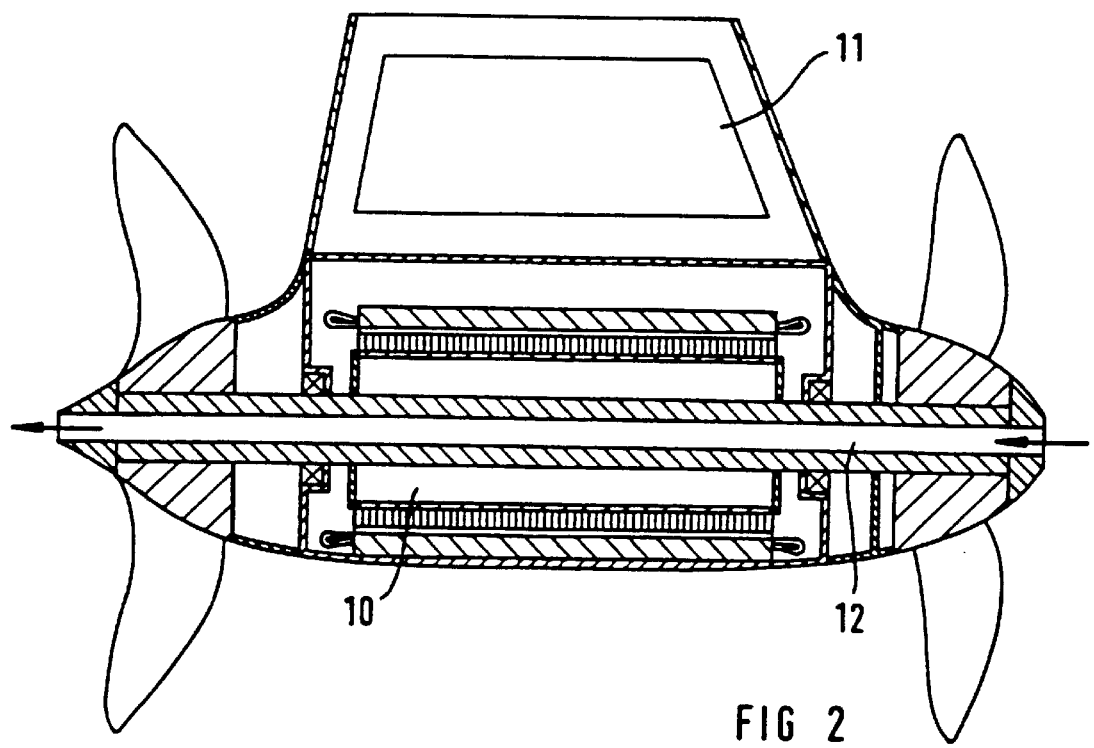
FIG. 2 shows a sectional view of a propulsion pod cooled in accordance with the present invention.

FIG. 2 shows a diagrammatic representation of a propulsion pod with the electric motor 10, which is connected by heat ducts (not represented) to one or a number of cooling elements 11 in the lower part of the access shaft, in particular on the walls of the lower part of the access shaft. For further cooling, the propulsion pod shown has a hollow shaft through which water flows. The flow duct in the hollow shaft is designated by 12 and the arrows indicate the direction in which the water flows through the shaft. The heat ducts (not shown) are, like the flow duct, advantageously configured without installation features.

Figure 3:
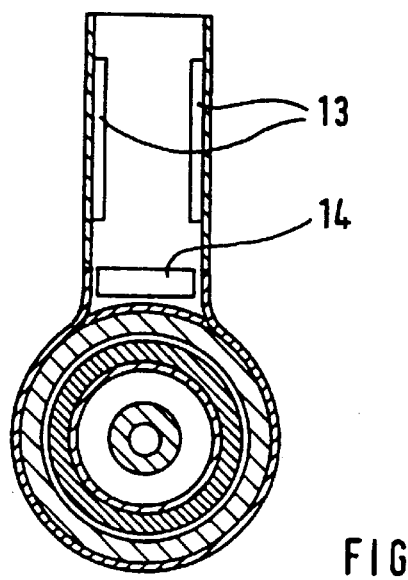
FIG. 3 shows a sectional view of a cooling surface arrangement in accordance with FIG. 2.

FIG. 3 shows, again diagrammatically, cooling elements 13 and 14 located in the lower part of the access shaft. Like the embodiment of a cooling element shown diagrammatically in FIG. 2, all the cooling elements known from cooling technology can be employed here. The arrangement of the cooling elements is arbitrary and additional cooling elements are also possible in the free space of the hollow access shaft. The electric motor does not, in fact, need to be accessible.

Figure 4:
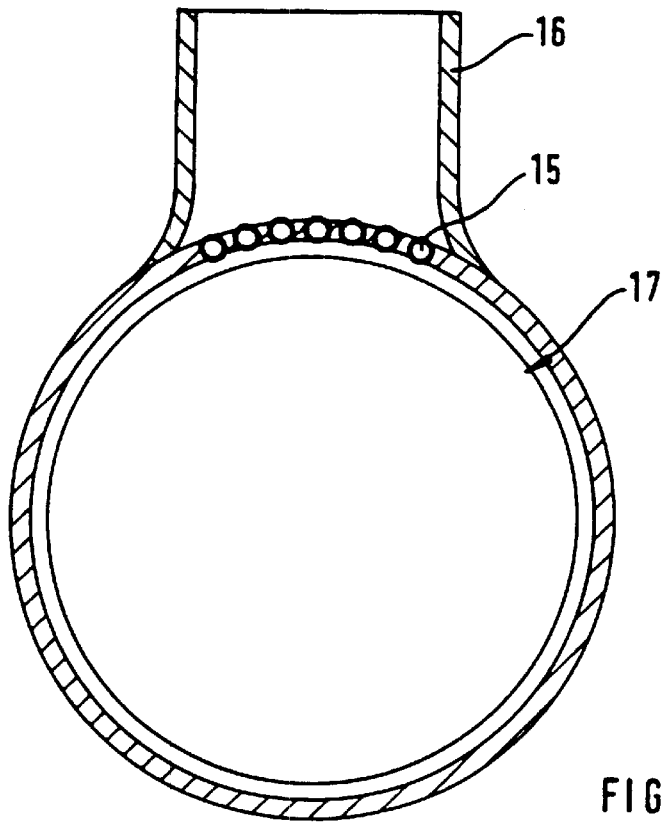
FIG. 4 shows sectional view of a cooling ducts, through which water flows, at the transition between the propulsion pod and the access shaft.

Coolant tubes 15 at the transition from the access shaft 16 to the propulsion pod 17 are shown in FIG. 4. Like the hollow shaft shown in FIG. 2, flow takes place through them in the longitudinal direction. The outer surfaces of the coolant tubes 15 can also be connected to the inside of the propulsion motor by means of heat ducts. The coolant tubes 15 can, however, also be used for particularly intensive cooling of the part of the pod outer wall facing them.

Figure 5:
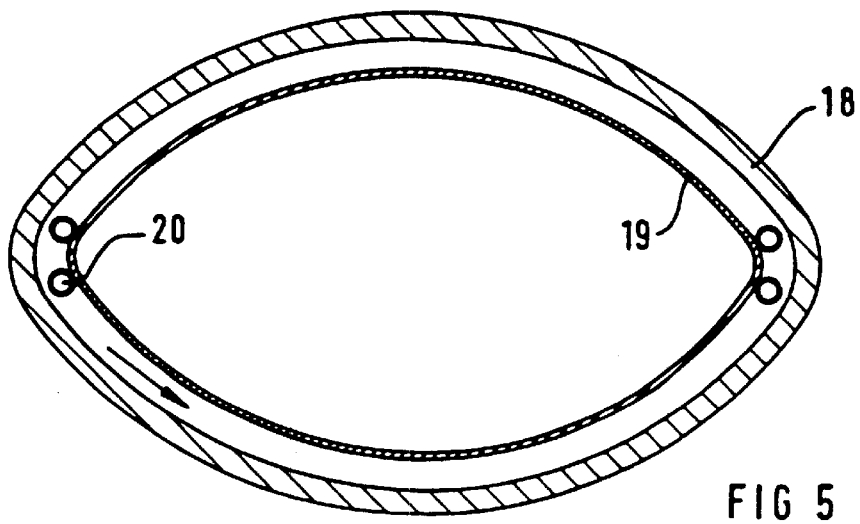
FIG. 5 shows a sectional view of the arrangement of an inner double wall in the lower part of the access shaft.

FIG. 5 shows a double-walled embodiment of the lower part of the access shaft with the outer wall 18 and an inserted inner wall 19, with heat ducts 20, which are here configured in an embodiment in which water flows through them, entering into the intermediate space between the outer wall 18 and the inner part 19. In the case where water is used, the flow cross section for the coolant is preferably round; if heat ducts for air are used, inlet flow slots are preferably provided.

Figure 6:
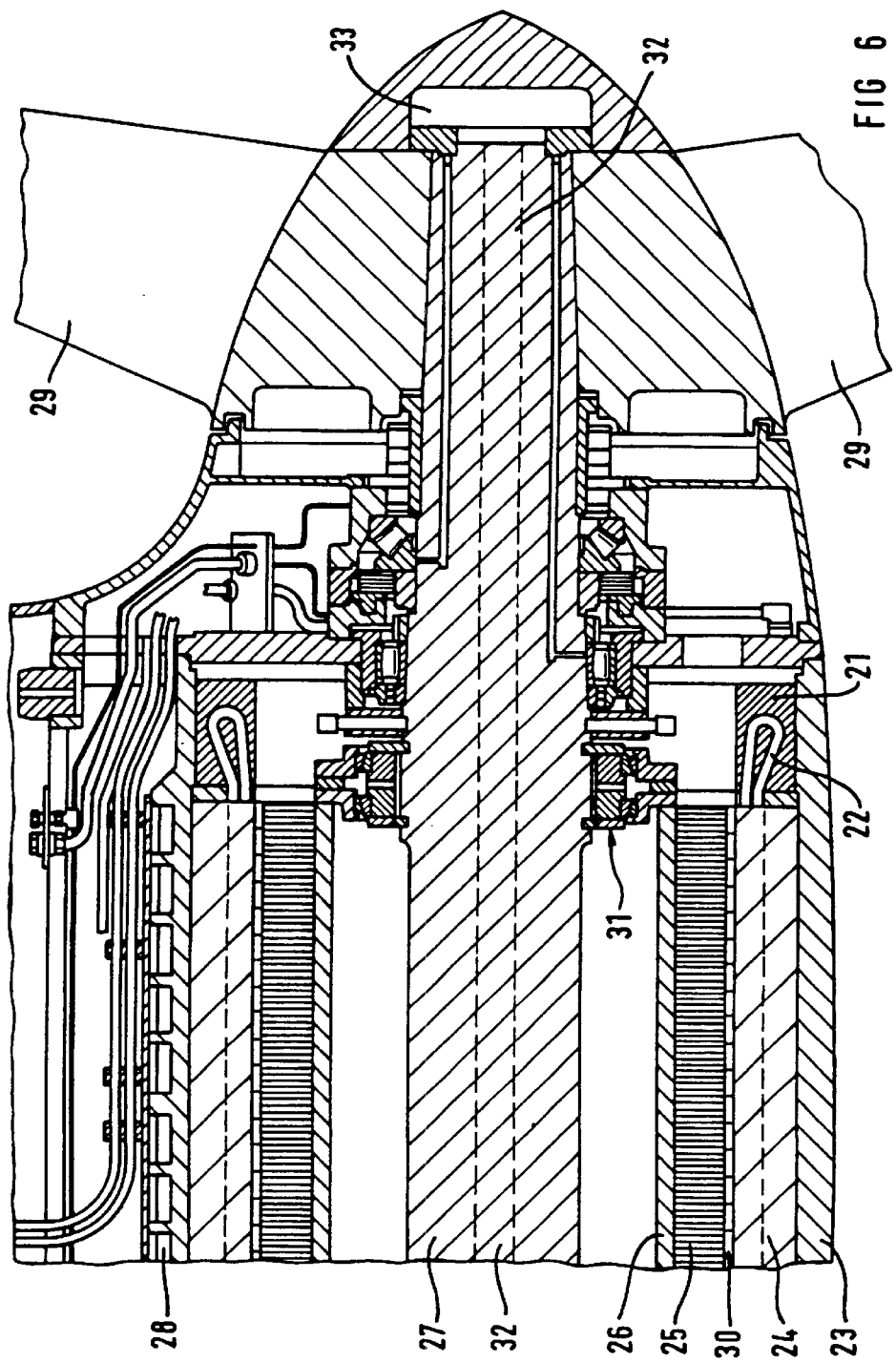
FIG. 6 shows a detailed section through one end of the propulsion pod with heat bridges in the region of the coil winding heads.

In FIG. 6, which shows a detailed section through one end of the body of the propulsion pod, 21 designates a heat bridge for the coil winding heads 22 of the stator windings 24. The stator windings 24 are located centrally in the actual pod body 23, which is preferably made from the same material as the propeller 29, i.e. from propeller bronze. The air gap 30 is located between the rotor winding 25 and the stator winding 24. The rotor 25 is arranged on an inner tube 26, which is in turn fastened to the shaft 27. The fastening takes place by means of a coupling 31. At the access shaft end, the pod housing 23 also has cooling chambers 28, which can be used as the outlet for heat ducts into the access shaft. In this case, it is then possible to dispense with enlarging the surface by ribs or the like. The coupling, the shaft bearing system etc. are not part of the invention and are therefore not shown in any more detail.

In the hub, there is also a hollow space 33 which, if appropriate, is connected to the central part of the propulsion pod, which is subject to heat, by a large central bore 32 (shown by interrupted lines) in the shaft 27. This permits good thermal utilization of the cool ends of the propulsion pod.

The invention's cooling elements in accordance with the invention permit a multiplicity of cooling combinations. The individual measures are selected to suit the area in which the ship is traveling and the size of the motor. A common feature is that they dispense with long coolant paths and coolant circulating units. This results in a substantial improvement even when compared with the prior art shown in U.S. Pat. No. 5,403,216 and U.S. Pat. No. 2,714,866.

Although modifications and changes may be suggested by those skilled in the art, it is the intention of the inventors to embody within the patent warranted hereon all changes and modifications as reasonably and properly come within the Scope of their contribution to the art.

We claim:

1. An electric propulsion pod system for a ship, comprising:

an electric propulsion pod containing an electric motor having an electric motor external region and being fitted within said electric propulsion pod for providing a water propulsion wherein said electric motor generates an amount of electric motor heat, said electric propulsion pod including an electric propulsion pod outer wall defining an electric propulsion pod surface;

a ship access shaft being secured below said ship and immersible in water for connecting said electric propulsion pod to said ship, said ship access shaft including a ship access shaft outer wall defining a ship access shaft surface, a ship access shaft hollow region and a ship access shaft lower end;

said electric propulsion pod being connected to said ship access shaft at said ship access shaft lower end wherein an electric propulsion pod transition region is defined;

said electric motor heat being conducted by said electric propulsion pod surface in an amount greater than by said ship access shaft surface of said electric propulsion pod transition region wherein said amount of electric motor heat is subsequently released from said electric propulsion pod surface and from said ship access shaft surface into said water;

an electric propulsion pod heat rejection member being fitted for increasing said amount of electric motor heat being conducted and released into said water; and wherein said electric propulsion pod heat rejection member comprises said ship access shaft lower end having a ship access shaft double-walled configuration, said ship access shaft double-walled configuration has an inside ship access shaft double-walled region that contains a heat conducting media, said heat conducting media consists of air and water.

2. The electric propulsion pod system according to claim 1, wherein said electric propulsion pod heat rejection member comprises said electric propulsion pod surface and said ship access shaft surface of a heat rejection member heat conductive material, said heat rejection member heat conductive material has a higher thermal conductivity than steel for improving said conduction and subsequent release of said amount of electric motor heat.

3. The electric propulsion pod system according to claim 2, wherein said heat rejection member heat conductive material consists essentially of a nonferrous metal alloy.

4. The electric propulsion pod system according to claim 2, wherein said heat rejection member heat conductive material comprises a bronze alloy.

5. The electric propulsion pod system according to claim 4, wherein said bronze alloy comprises G-Cu Al 10 Ni.

6. The electric propulsion pod system according to claim 1, wherein said electric propulsion pod heat rejection member comprises said electric propulsion pod surface of a bright metallic material.

7. The electric propulsion pod system according to claim 1, wherein said electric propulsion pod heat rejection member comprises said electric propulsion pod outer wall of said electric propulsion pod transition region having an electric propulsion pod reduced wall thickness.

8. The electric propulsion pod system according to claim 1, wherein said electric propulsion pod heat rejection member comprises said electric propulsion pod surface of said electric propulsion pod transition region having an enlarged electric propulsion pod surface, said enlarged electric propulsion pod surface includes ribs, beads and a honeycomb sheet.

9. The electric propulsion pod system according to claim 8, wherein said enlarged electric propulsion pod surface comprises a plurality of electric propulsion pod heat conduction devices, each of said electric propulsion pod heat conduction devices are connected to said electric propulsion pod electric motor.

10. The electric propulsion pod system according to claim 1, wherein said electric propulsion pod heat rejection member comprises said ship access shaft having a plurality of ship access shaft fans for circulating air throughout said ship access shaft hollow region.

11. The electric propulsion pod system according to claim 10, wherein each of said ship access shaft fans are equipped to maintain a stable circulation of said air within said ship access shaft hollow region.

12. The electric propulsion pod system according to claim 1, wherein said electric propulsion pod heat rejection member comprises said electric propulsion pod having a plurality of electric propulsion pod heat conducting devices, each of said electric propulsion pod heat conducting devices contain an electric propulsion pod heat transfer media.

13. The electric propulsion pod system according to claim 1, wherein said electric propulsion pod electric motor comprises an electric motor hollow shaft, said electric motor hollow shaft has two hollow shaft ends for accepting said water.

14. The electric propulsion pod system according to claim 13, wherein said electric motor hollow shaft comprises an electric motor convective cooling circuit for transferring said amount of electric motor heat away from said electric propulsion pod electric motor.

15. The electric propulsion pod system according to claim 1, wherein said electric propulsion pod electric motor comprises a plurality of electric motor coil winding heads, each of said electric motor coil winding heads have a plurality of motor coil heat ducts for conducting said amount of electric motor heat.

16. The electric propulsion pod system according to claim 1, wherein said electric propulsion pod electric motor comprises a plurality of electric motor winding heads, each of said electric motor winding heads has a plurality of electric motor heat conducting bridges for conducting said amount of said electric motor heat.

17. The electric propulsion pod system according to claim 16, wherein each of said electric motor heat conducting bridges consists essentially of a heat conducting plastic.

18. The electric propulsion pod system according to claim 17, wherein said heat conducting plastic comprises filler materials.

19. The electric propulsion pod system according to claim 1, wherein said electric propulsion pod heat rejection member comprises a plurality of electric propulsion pod cooling ducts of said electric propulsion pod transition region.

20. The electric propulsion pod system according to claim 1, wherein said electric propulsion pod heat rejection member comprises said electric motor external region and said ship access shaft lower end having a heat rejection double-walled configuration, said heat rejection double-walled configuration has an inner heat rejection double-walled region for accepting said water.

21. The electric propulsion pod system according to claim 1, wherein said heat rejection member comprises a maintenance-free heat rejection design.

\* \* \* \* \*